Figure 1:
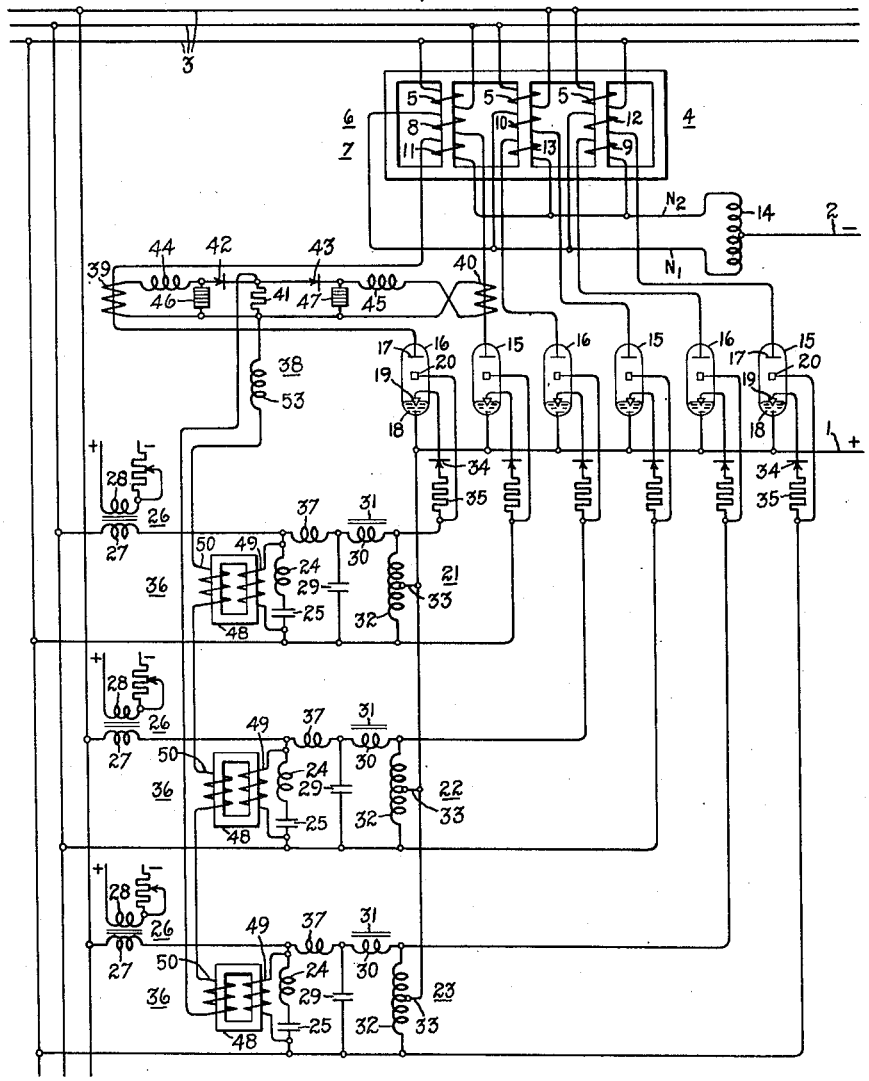

Oct. 23, 1951  A. H. MITTAG  2,572,648
ELECTRIC VALVE TRANSLATING SYSTEM
Filed Aug. 4, 1949  2 SHEETS—SHEET 1

Inventor:
Albert H. Mittag,
by *Bravell S. Mack*
His Attorney.

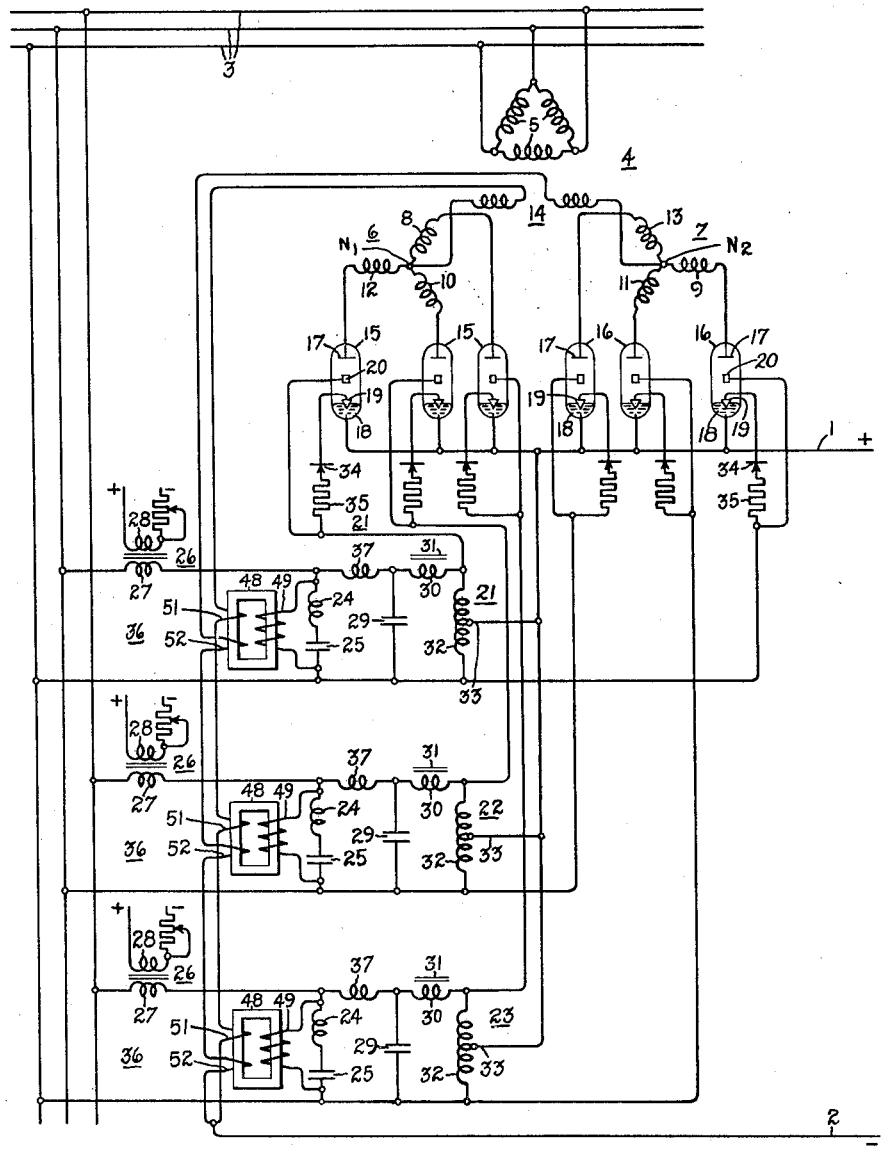

Patented Oct. 23, 1951

2,572,648

UNITED STATES PATENT OFFICE 2,572,648

ELECTRIC VALVE TRANSLATING SYSTEM

Albert H. Mittag, Schenectady, N. Y., assignor to General Electric Company, a corporation of New York Application August 4, 1949, Serial No. 108,487

3 Claims. (Cl. 321—27)

My invention relates to electric valve translating systems, and more particularly, to electric valve apparatus of the type employing an ionizable medium, such as a gas or a vapor, and which includes a control member for determining or controlling the amount of current transmitted to an associated load circuit.

It has been found heretofore that it is highly desirable in electric valve translating apparatus to employ electric valve means of the type having a control member which determines or controls the amount of current transmitted to an associated load circuit. It has also been found in practice that it is highly desirable to energize the control members by transmitting thereto impulses of voltage of peaked wave form because of the precision of control which may be obtained in rendering the electric valves conducting at predetermined instants during the cycle of voltage of the associated supply circuit. It is also customary to employ in such electric valve translating apparatus a three-phase power supply transformer. In certain applications of such electric valve translating apparatus, the physical space limitations are such as to require that the usual unitary three-legged core structure cannot be used in these transformers but that, for instance, a five-legged magnetic core must be used or a group of single phase transformers with separate cores must be used. When such magnetic structures other than a three-legged core must be used, the even harmonics, especially the second harmonic, of the alternating current in the transformer secondary windings increases. This second harmonic is troublesome and unwanted because it causes electric valves which are electrically displaced 180° from one another to conduct unequal amounts of current. Half of the valves of the system are thereby dangerously overloaded and the other half are underloaded.

It is, therefore, an object of my invention to provide a new and improved load balancing system for electric valve translating apparatus wherein a plurality of electric valves are connected in the system to operate in parallel. It is a further object of my invention to provide such a load balancing system to specifically counteract a load unbalance caused by the presence of excessive even harmonic currents but which is, nevertheless, operative and useful to correct for load unbalances from other causes.

In carrying out my invention, therefore, an electric valve translating apparatus may be employed having electric valve means with control members energized by impulses of voltage of peaked wave form and having a load unbalance detecting circuit and an electrically non-linear apparatus interposed between the load unbalance detecting means and the electric valve control members. A load unbalance signal causes a respective shift between half cycles of each cycle of the alternating voltage of peaked wave form which energizes the control members, thus balancing the load by decreasing the period of conduction of overloaded valves and increasing the period of conduction of underloaded valves.

For a better understanding of my invention, reference may be had to the following description taken in connection with the accompanying drawings, and its scope is pointed out in the appended claims. Fig. 1 diagrammatically illustrates an embodiment of my invention as applied to a polyphase rectifying system, and Fig. 2 illustrates a modification of my invention wherein a different load unbalance detecting means is employed.

Referring to Fig. 1 of the drawings, I have there illustrated my invention diagrammatically as applied to a polyphase rectifying system for energizing a load circuit including conductors 1 and 2 from a polyphase alternating current supply circuit 3. The electric valve translating system comprises a five-legged core transformer 4 including a plurality of primary windings 5 and two groups 6 and 7 of electrically displaced secondary phase windings. The two groups of secondary windings 6 and 7 include displaced windings 8–13 having neutral connections $N_1$ and $N_2$, respectively, which are connected to the negative conductor 2 of the direct current load circuit through an interphase transformer 14.

The electric translating apparatus also includes two groups 15 and 16 of electric valve means or electric discharge paths, each valve or path connected to a different one of the phase windings 8–13, inclusive, group 15 being connected to the secondary phase windings in group 6 and group 16 to the windings in group 7. The electric valve means 15 and 16 are preferably of the type employing an ionizable medium, such as a gas or a vapor, and each includes an anode 17, a cathode 18 of the self-reconstructing type, such as a mercury pool cathode, and a control member 19 of the immersion-ignitor type having an extremity extending into the mercury and constructed of a material such as boron carbide or silicon carbide having an electrical resistivity relatively large compared with that of the associated mercury. If desired, the electric valve means 15 and 16 may also be provided with transfer or relieving electrodes 20.

I employ a plurality of excitation circuits 21, 22 and 23 of the nature disclosed and claimed in my U. S. Letters Patent No. 2,362,294, granted November 7, 1944, and assigned to the same assignee as the present application. These excitation circuits are of the oscillatory type which produce periodic or alternating voltages of peaked wave form and each includes an input voltage stabilizing circuit comprising an inductance 24 and a capacitance 25, a saturable inductive reactor 26 having a main winding 27 and a control winding 28. A capacitor 29 is provided which is charged from an associated source of alternating current, such as the supply circuit 3, during a portion of the cycle of the voltage of said supply circuit. A non-linear self-saturating inductive reactance 31 is provided, having a winding 30 through which capacitor 29 is discharged when this reactance becomes saturated. The excitation circuits 21—23 also include means such as an auto-transformer 32 having a neutral connection 33. The capacitance 29 discharges through the reactance 30 and produces across the terminals of this transformer voltages of peaked wave form. The neutral connections 33 of the transformers 32 are connected to the cathodes 18 of the electric valve apparatus, and the terminals of the transformer 32 are connected to the control members 19 through unidirectional conducting devices 34 and through transfer resistances 35. The terminals of the transformer 32 are also connected to the relieving electrodes 20.

It will be seen that saturable reactor 26 and inductance 24 and capacitance 25 are connected between the supply circuit 3 and the firing circuit consisting of capacitance 29 and non-linear reactor 31. These components together constitute a phase shifting network 36 which shifts the phase of the voltage supplied to the firing circuit with respect to the voltage supplied to the power input circuit at transformer 4 to establish the desired control over the rectifying apparatus. A linear reactor 37 is connected between the phase shifting circuit 36 and the firing circuits 21—23 in order to control and limit the rate of charge of capacitors 29 and in order to prevent discharge of capacitors 29 back through the supply circuit.

Excitation circuit 21 transmits energizing impulses of current of peaked wave form to the control members 19 of the first pair of electric valve means 15 and 16 shown on the left in the drawing which are connected to phase windings 8 and 11, respectively, which are displaced substantially 180 electrical degrees. In like manner the excitation circuits 22 and 23 are connected to energize the control members of the other pairs of electric valve means 15 and 16 which are respectively displaced by 180 electrical degrees.

I provide a control circuit 38 which controls excitation circuits 21—23 to maintain a predetermined division of current or load among the groups 6 and 7 of the phase windings, and, consequently, maintains an equal distribution of load current among the associated respective groups of electric valve means. The control circuit 38 includes polarity selective current responsive means, such as differentially connected current transformers 39 and 40, energized in response to the currents transmitted by the first pair of electric valves 15 and 16 which are connected to different groups of phase windings. While the current transformers 39 and 40 are shown as being connected to be responsive to the anode currents of the first pair of electric valve means 15 and 16, it will be understood that these current responsive devices could be associated with other pairs of the electric valves such as those associated with phase windings 10 and 13. The control circuit 38 includes an impedance element such as a resistance 41 which is energized in response to the difference in currents conducted by electric valve means 15 and 16. This selective energization of the resistance 41 may be obtained by employing a pair of unidirectional conducting devices 42 and 43 which are poled to transmit current in opposite directions through resistance 41. In order to stabilize the voltage appearing across resistance 41 and to prevent over-shooting and under-shooting, current limiting reactances 44 and 45 may be connected in series relation with unidirectional conducting devices 42 and 43, respectively. A protective or voltage limiting means, such as a pair of resistances 46 and 47, may be connected in the circuit as shown and may be constructed of a material having a negative impedance-current characteristic such as that disclosed and claimed in United States Letters Patent No. 1,822,742 of Karl B. MacEachron, granted September 8, 1931, and which is assigned to the assignee of this application.

Saturable inductive devices 48 are provided for each of the excitation circuits 21—23. Devices 48 each have a secondary winding 49 connected across the combination of inductance 24 and capacitance 25 and thereby in parallel with the power input to the respective excitation circuits 21—23. Each of these inductive devices 48 is also equipped with a control winding 50 which is connected to be energized from the voltage appearing across resistance 41. These devices are unsymmetrically saturable; that is, the saturation caused by a direct current in the control winding 50 saturates the magnetic core of the device in such a way as to affect the impedance of the secondary winding 49 differently on one loop of each cycle of alternating current than on the other loop. This characteristic of devices 48 causes alternating voltage components of even harmonic frequencies, particularly the second harmonic frequency to appear in the supply voltage to the excitation circuits 21—23. This characteristic is employed in my invention as will be more fully described below. In order to prevent the transmission of alternating components of voltage appearing across the terminals of resistance 41 to control windings 50 and, therefore, to increase the sensitivity and precision of control, I provide suitable filtering means such as an inductance 53 which is connected in series relation with control windings 50.

When an unbalanced condition occurs between the groups of rectifiers 15 and 16 due to the presence of an excessive even harmonic current, such as a second harmonic, in the supply transformer 4, or due to any other cause, such load unbalance is detected by circuit 38, the difference in the currents to the two rectifiers in the first pair being measured by current transformers 39 and 40 and appearing at resistance 41. The unbalance signal appearing at resistance 41 then energizes the control windings 50 of the unsymmetrically saturable reactors 48, thereby giving rise to a second harmonic voltage at the terminals of the saturable reactor secondary windings 49.

This voltage thereby serves to shift the phase relationship of the firing voltage peaks of the excitation circuits, advancing the voltage peak in the half cycle when the lightly-loaded valve of each pair is excited thus increasing the load on each of such valves, and retarding the voltage peak in the half cycle when the heavily loaded valve of each pair is excited thus decreasing the current in each of such valves and thereby forcing a balance in the circuit.

Fig. 2 is a modification of my invention wherein a different load unbalancing detection means is employed in place of the control circuit 38 in Fig. 1. This is accomplished by dividing the control winding 50 of saturable reactor 48 into two equal opposing windings 51 and 52, each of which carries the current from one half of the interphase transformer. Use is thereby made of the characteristic that an unbalanced load between windings of transformer 4 which are displaced 180 electrical degrees give rise to unequal currents in the two halves of the inter-phase transformer. As long as the loads are balanced, the magnetic effects of windings 51 and 52 substantially cancel one another, but if an unbalance occurs and the currents in the two halves of the inter-phase transformer are unequal, the resulting unequal currents in the windings 51 and 52 give rise to a second harmonic voltage at the terminals of secondary winding 49 and control is thereby achieved as described above for the embodiment of Fig. 1.

It will be seen from the above that my improved electric valve translating system provides for a positive and economical control to maintain load balance, thus making it possible to employ components which are desirable from a structure standpoint, but which otherwise would give rise to ruinous load unbalance conditions. My load-balancing system can also be used to improve and perfect the load balance in a system of the usual construction in unusual applications where extremely fine load balance is necessary.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a load circuit, electric translating apparatus connected between said circuits and comprising two groups of electrically displaced phase windings and a plurality of electric discharge paths each associated with a different one of said phase windings and each including an anode and a control member, a plurality of excitation circuits connected to said control members for transmitting thereto periodic voltages of peaked wave form, no more than one of said excitation circuits being provided for every two of said control members, a controller for dividing the load equally between the groups of phase windings comprising a pair of differentially connected current windings one of which carries a portion of the current conducted by one group and the other of which carries a portion of the current conducted by the other group, said controller including an unsymmetrically saturable reactor for said excitation circuits adapted to be saturated in response to an unbalance of currents in said current windings to cause a shift in one direction of the periodic voltages of peaked wave form for the control of the currents in one group of phase windings to increase said currents, and to cause a shift in the other direction of the periodic voltages of peaked wave form for the control of the currents in said other group of phase windings to decrease said currents to thereby equalize the currents in the two groups.

2. In combination, an alternating current supply circuit, a load circuit, electric translating apparatus connected between said circuits and comprising a five-legged magnetic core, two groups of electrically displaced phase windings arranged on three legs of said core and a plurality of electric discharge paths each associated with a different one of said phase windings and each including an anode and a control member, a plurality of excitation circuits connected to said control members for transmitting thereto periodic voltages of peaked wave form, no more than one of said excitation circuits being provided for every two of said control members, a controller for dividing the load equally between the two groups of phase windings comprising a pair of differentially connected current transformers one of which is connected in series with one phase winding of one group and the other of which is connected in series with one phase winding of another group, an impedance element, a pair of unidirectional conducting devices respectively connected in series with the secondary windings of said current transformers and connected to transmit current in opposite directions through said impedance element, a circuit for controlling said excitation circuits in response to the voltage across said impedance element including a non-symmetrically saturable reactor for each of said excitation circuits having direct current saturating windings connected for energization by the voltage across said impedance element to cause a shift in one direction of the periodic voltages of peaked wave form for the control of the currents in one group of phase windings to increase said currents, and to cause a shift in the other direction of the periodic voltages of peaked wave form for the control of the currents in the other group of phase windings to decrease said currents.

3. In combination, an alternating current supply circuit, a load circuit, electric translating apparatus connected between said circuits and including two groups of electrically displaced phase windings and a plurality of electric discharge paths each associated with a different one of said phase windings and each including an anode and a control member, a plurality of excitation circuits connected to said control members for transmitting thereto periodic voltages of peaked wave form, no more than one of said excitation circuits being provided for every two of said control members, the individual phase windings in each of said groups having a common electrical connection, circuits for controlling the division of load between the groups of phase windings comprising an unsymmetrically saturable reactor for each of said excitation circuits, each reactor including two saturating control windings, the first control winding of each of said reactors being connected in series between the common electrical connection of one group of phase windings and the load, and the second control winding of each of said reactors being connected in series between the common electrical connection of the phase windings in the other group and the load, said control windings together being adapted to carry the full output load current, said control windings in each of said saturable reactors being differentially connected to cause saturation of said reactors when the load current carried by one group of phase windings exceeds the load current carried by the other group of phase windings to cause a shift in one direction of the periodic voltages of peaked wave form for the control of the currents in one group of phase windings to increase said currents, and to cause a shift in the other direction of the periodic voltages of peaked wave form for the control of the currents in the other group of phase windings to decrease said currents.

ALBERT H. MITTAG.

REFERENCES CITED

The following references are of record in the file of this patent:

UNITED STATES PATENTS

| Number | Name | Date |
| --- | --- | --- |
| 2,028,706 | Kern | Jan. 21, 1936 |
| 2,040,748 | Le Roy | May 12, 1936 |
| 2,137,098 | Schilling | Nov. 15, 1938 |
| 2,291,092 | Cox et al. | July 28, 1942 |